No. 710,345. Patented Sept. 30, 1902.
T. J. SWISHER & V. A. A. & E. BURGER.
WAGON BRAKE.
(Application filed June 20, 1902.)
(No Model.)
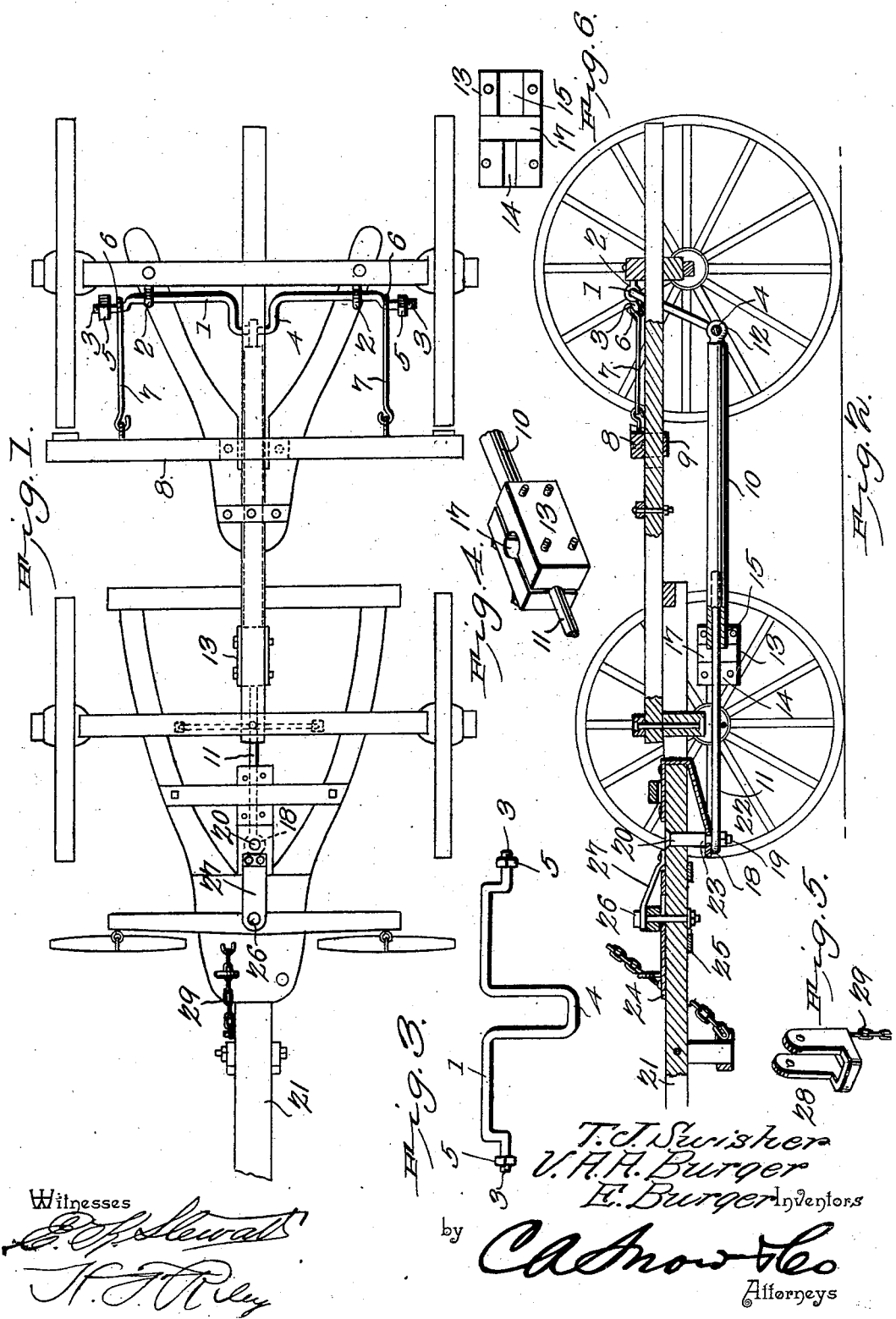
Witnesses
E. H. Stewart
N. H. Riley
Inventors
T. J. Swisher
V. A. A. Burger
E. Burger
by C. A. Snow & Co.
Attorneys

United States Patent Office.

THOMAS J. SWISHER, VICTOR A. A. BURGER, AND EDWARD BURGER, OF KOKOMO, INDIANA.

WAGON-BRAKE.

SPECIFICATION forming part of Letters Patent No. 710,345, dated September 30, 1902.

Application filed June 20, 1902. Serial No. 112,534. (No model.)

*To all whom it may concern:*

Be it known that we, THOMAS J. SWISHER, VICTOR A. A. BURGER, and EDWARD BURGER, citizens of the United States, residing at Kokomo, in the county of Howard and State of Indiana, have invented a new and useful Wagon-Brake, of which the following is a specification.

The invention relates to improvements in wagon-brakes.

The object of the present invention is to improve the construction of vehicle-brakes and to provide a simple and comparatively inexpensive one of great strength and durability adapted to be readily applied to a wagon and capable of being lengthened and shortened when the running-gear of the wagon is adjusted and capable of automatic operation and of being locked out of operation when it is desired to back a vehicle.

The invention consists in the construction and novel combination and arrangement of parts hereinafter fully described, illustrated in the accompanying drawings, and pointed out in the claims hereto appended.

In the drawings, Figure 1 is a plan view of a running-gear provided with a brake constructed in accordance with this invention. Fig. 2 is a longitudinal sectional view of the same. Fig. 3 is a detail view of the rock-shaft. Fig. 4 is a detail view of the clamp. Fig. 5 is a detail view of the pivoted locking device for holding the brake out of operation when it is desired to back a vehicle. Fig. 6 is a detail view of one of the sections or members of the clamp.

Like numerals of reference designate corresponding parts in all the figures of the drawings.

1 designates a transverse rock-shaft journaled in suitable bearings 2 of the rear bolster of a running-gear and provided at its ends with approximately L-shaped arms 3 and having a central depending loop 4, extending downward beneath the reach of the running-gear and connected with one member of an adjustable connection which extends forward to a point beneath the tongue. The outer portions of the arms 3 are threaded for the reception of nuts 5, which retain eyes 6 of links 7 on the L-shaped arms, and these links 7 extend forward to a transverse brake-beam 8, which is mounted to slide on the rear portion of the reach and which is located above the same and the rear hounds. The transverse brake-beam, which is provided at its ends with suitable brake-shoes, has a central depending loop or sleeve 9, which receives the reach. When the rock-shaft is partially rotated, the brake-beam will be moved backward and forward to carry the brake-shoes into and out of engagement with the hind wheels.

The adjustable connection which extends from the rock-shaft to the tongue is composed of two telescoping sections or members 10 and 11, the section 10 consisting of a tube provided at its rear end with an eye 12, which receives the depending loop of the rock-shaft and which is preferably provided with a shank secured within the rear end of the tubular section 10; but any other form of eye may be employed. The section 11, which consists of a rod, extends into the tubular section 10, and both sections are engaged by a clamp 13, composed of two blocks or members and provided with a longitudinal opening formed by grooves 14 and 15 of different diameters, the front grooves 14 being of a size to receive the rod and the rear grooves being of a size to receive the tubular section 10. The sections or members of the clamp 13 are connected by screws or other suitable fastening devices, and they are firmly held in engagement with the rod and with the tube. The sections or members of the clamp are also provided with transverse grooves 17, forming an opening and adapted to permit the operater to see if the tubular section is properly engaged by the clamp. The clamp is adapted to secure the sections at any desired adjustment, and the telescoping sections form an adjustable connection which is adapted to be varied in length as the running-gear is lengthened or shortened.

The front end of the rod 11 is provided with an eye 18, receiving the lower end 19 of a rod or bolt 20, extending downward from the rear portion of the tongue 21 of the running-gear and supported by an inclined brace 22. The rod or bolt is provided near its lower end with a shoulder 23, against which the lower end of the brace and the eye 18 abut, whereby the the same are prevented from working upward on the rod or bolt. The eye 18 is retained on the rod or bolt by a nut or other suitable fastening device, and the rear end of the tongue is slidably arranged between the front ends of the front hounds, which are connected by a top plate 24 and by bottom pieces 25. The whiffletrees are connected with the tongue by a pivot 26, extending through the doubletree and through the tongue and supported by a brace 27. When the tongue moves rearward between the front hounds by reason of the running-gear moving forward on the draft-animals in descending a hill or incline, the rock-shaft will be rotated and the loop swung rearward, thereby swinging the arms of the rock-shaft backward and carrying the brake-shoes into engagement with the rear wheels.

When it is desired to back the vehicle without applying the brake, a pivoted locking device 28, which is mounted on the tongue in advance of the front hounds, is swung upward into a position for engaging the same. The locking device, which is connected to a chain 29 or other suitable operating means, is approximately U-shaped, being composed of two L-shaped sides and a connecting transverse portion, and one of the sides is provided with an ear at its rear edge to receive one of the links of the chain. When the locking device is swung upward, the transverse connection portion engages the lower face of the tongue, and the sides are located at opposite sides of the tongue.

It will be seen that the brake is exceedingly simple and inexpensive in construction, that it is positive, reliable, and automatic in its operation, and that it is capable of adjustment to correspond to the adjustment of the running-gear when the latter is lengthened or shortened.

What we claim is—

1. In a device of the class described, the combination with a running-gear having a sliding tongue, of a transverse rock-shaft mounted on the rear portion of the running-gear and designed to be connected with a brake bar or beam, and an adjustable connection extending from the rock-shaft to the tongue and composed of telescoping sections, one of the sections being tubular and the other consisting of a rod, and a clamp composed of adjustable members having grooved inner faces, the grooves being of different diameters and receiving and engaging the rod and the tubular section of the connection, substantially as described.

2. In a device of the class described, the combination with a running-gear having a sliding tongue, of an adjustable connection extending rearward from the tongue and composed of a rod, and a tube receiving the rod, a clamp composed of two sections or members provided at their inner faces with grooves of different diameters receiving the rod and the tube and engaging the same, and means for connecting the tube with brake-shoes, substantially as described.

3. In a device of the class described, the combination with a running-gear having a sliding tongue, of a brake-beam having brake-shoes, a rock-shaft journaled on the rear portion of the running-gear and provided at its ends with arms connected with the brake-beam, said rock-shaft being also provided with a central loop, a tube or pipe secured to the loop, a rod telescoping in the tube or pipe, a clamp composed of sections or members having grooves of different diameters to receive the rod and the pipe or tube, a rod or bolt depending from the tongue and receiving the front end of the rod, a brace supporting the depending rod or bolt, and means carried by the tongue for engaging the front hounds to lock the brake out of operation, substantially as described.

In testimony that we claim the foregoing as our own we have hereto affixed our signatures in the presence of two witnesses.

THOMAS J. SWISHER.
VICTOR A. A. BURGER.
EDWARD BURGER.

Witnesses:
 THOMAS ROWNEY,
 W. L. COOMBS.